United States Patent
Golden et al.

[11] Patent Number: 6,125,152
[45] Date of Patent: *Sep. 26, 2000

[54] OUTPUT SIGNAL MODIFICATION PROVIDING PHASE AMPLIFIED INFORMATION FOR SOFT DECISION DECODING

[75] Inventors: Glenn David Golden; Nelson Ray Sollenberger, both of Tinton Falls; Jack Harriman Winters, Middletown, all of N.J.

[73] Assignee: Lucent Technologies, Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/695,492

[22] Filed: Aug. 12, 1996

[51] Int. Cl.⁷ .............. H04L 1/00; H04B 1/10; H04B 7/00

[52] U.S. Cl. .......... 375/340; 375/347; 455/278.1

[58] Field of Search ................ 375/345, 346, 375/347, 348, 340, 316, 324, 325, 341, 349, 229, 230, 231, 232, 233; 455/132, 137, 139, 296, 63, 65, 303, 305, 138, 276.1, 278.1, 306, 307, 272, 273, 311, 312, 304, 310, 334, 337, 561, 562, 504, 67.3; 370/343, 345, 347

[56] References Cited

U.S. PATENT DOCUMENTS

| | | | |
|---|---|---|---|
| 4,313,170 | 1/1982 | Lewis et al. | 364/517 |
| 5,396,656 | 3/1995 | Jasper et al. | 455/295 |
| 5,481,570 | 1/1996 | Winters | 375/347 |
| 5,675,285 | 10/1997 | Winters | 330/124 R |

OTHER PUBLICATIONS

Winters, J., Signal Acquisitions and Tracking with Adaptive Arrays in the Digital Mobile Radio Systems IS–54 with Flat Fading; published in IEEE Transactiosn on Vehicular Technology, vol. 42, No. 4, Nov., 1993, pp. 377–384.

Winters, J., et al the Impact of Antenna Diversity on the Capacity of Wireless Communications Systems, published in IEEE Transactions on Communications, vol. 42, No. 2/3/4, Feb., Mar., Apr. 1994 pp. 1740–1751.

*Primary Examiner*—William Luther
*Attorney, Agent, or Firm*—Gibbons, Del Deo, Dolan, Griffinger & Vecchione

[57] ABSTRACT

An improvement of a digital wireless receiver comprises a processing circuit for processing a plurality of received signals, and providing a processed signal having an amplitude; and an adjusting circuit for adjusting the amplitude of the processed signal, the adjusting circuit coupled to the processing circuit, where the adjusting circuit adjusts the amplitude as a function of distortion of the plurality of received signals. The processing circuit can weight and combine the plurality of received signals. The distortion can be estimated from a squared error of the plurality of received signals, which can be averaged over a sliding window. The function can comprise multiplying the processed signal by square root of the averaged squared error. Such amplitude adjustment is useful to maintain the soft decision information for the processed signal that is fed to a base station having soft decision decoding, or can be used in the base station with soft decoding.

28 Claims, 4 Drawing Sheets

OUTPUT SIGNAL MODIFICATION PROVIDING PHASE AMPLIFIED INFORMATION FOR SOFT DECISION DECODING

CROSS REFERENCES TO RELATED APPLICATIONS

This application is related to copending U.S. patent application Ser. No. 08/606,777, entitled "Introducing Processing Delays As A Multiple Of The Time Slot Duration" filed on Feb. 27, 1996 now U.S. Pat. No. 5,887,073.

FIELD OF THE INVENTION

The present invention relates to the field of wireless communication and more particularly to digital wireless communication systems.

BACKGROUND OF THE INVENTION

In wireless communication systems, the use of antenna arrays at the base station has been shown to increase both range, through increased gain, and capacity, through interference suppression. With adaptive antenna arrays, the signals received by multiple antenna elements are weighted and combined to improve system performance, e.g., by maximizing the desired receive signal power and/or suppressing interference. The performance of an adaptive antenna array increases dramatically with the number of antennas. Referring to an article entitled, "The Impact of Antenna Diversity on the Capacity of Wireless Communication Systems," by J. H. Winters, R. D. Gitlin and J. Salz, in IEEE Trans. on Communications, April 1994, it is shown that using an M element antenna array with optimum combining of the received signals can eliminate $N \leq M-1$ interferers and achieve an M-N fold diversity gain against multipath fading, resulting in increased range.

Most base stations today, however, utilize only two receive antennas with suboptimum processing, e.g., selection diversity where the antenna having the larger signal power is selected for reception and processing. It is desirable to be able to modify existing base stations to accommodate larger arrays of antennas and/or improved received signal combining techniques. However, modifying existing equipment is difficult, time consuming, and costly, in particular since equipment currently in the field is from a variety of vendors.

One alternative is to utilize an applique, which is an outboard signal processing box, interposed between the current base antennas and the input to the base station, which adaptively weights and combines the received signals fed to the base station, optionally utilizing additional antennas. FIG. 1 shows a base station utilizing an applique. A key to the viability of utilizing the applique approach is that it should require little, if any, modification of the base station equipment. This constraint implies that the processing performed by the applique must be transparent to the existing equipment. Ideally, the signal emerging from the applique should appear to the existing base station as a high-quality received signal from a single antenna.

A difficulty in achieving this is caused by the soft decision decoding which occurs in many base stations. With soft decision decoding, the received symbols are estimated using convolutional decoding based on path metrics dependent on both the phase error per symbol and the amplitude. The amplitude depends on the fading envelope of the received signal, which varies at a rate depending on the carrier frequency and the speed of a mobile unit, e.g., up to 184 Hz for a Personal Communication Service (PCS) system at 2 GHz. It is not desirable to perform the decoding in the applique, as the decoding and re-encoding of the output signal requires significant complexity and introduces additional delay. For example, in the North American digital mobile radio standard IS-136, interleaving is present on the transmitted signal, both within a time slot and between time slots, and thus decoding introduces at least an additional frame delay. However, if the applique does not perform decoding, but detects the received symbols, uses these detected symbols to remodulate the carrier, and sends the remodulated carrier signal to the base station for decoding, then the soft decision information is lost, resulting in degraded performance, e.g., a loss of the 2 dB gain due to soft decision decoding at a $10^{-2}$ bit error rate.

In order to avoid the loss of coding gain, it is insufficient to simply send the remodulated array output signal, i.e., the weighted and combined array output signal without data detection, to the base station, because standard adaptive array algorithms determine the weights that adjust the array output signal to closely match a reference signal, whose amplitude is typically constant and does not vary with the received signal level. In this case, the array output signal will have the phase error per symbol needed for soft decision decoding, but the weighted output signal will have nearly constant amplitude, at the sampling instant. Thus, the output signal has a noise level which varies with the fading (and a constant desired signal level) rather than a signal level that varies with the fading (and a constant noise level) which is needed for soft decision decoding.

A method in accordance with the present invention for performance improvement of a digital wireless receiver is described.

SUMMARY OF THE INVENTION

In accordance with the present invention, there is provided an apparatus for performance improvement of a digital wireless receiver. The apparatus comprises a processing circuit for processing a plurality of received signals and providing a processed signal having an amplitude and an adjusting circuit for adjusting the amplitude of the processed signal, the adjusting circuit coupled to the processing circuit, wherein the adjusting circuit adjusts the amplitude as a function of the estimated distortion of the processed signal.

In an enhancement of the present invention the processing circuit weights and combines the plurality of received signals.

In a further enhancement of the present invention the estimated distortion is a mean squared error of the processed signal relative to a reference signal, the trace of the interference plus noise correlation matrix, or the trace of the received signal cross-correlation matrix.

In yet other enhancements of the present invention the mean squared error can be averaged over a sliding window. The function comprises multiplying the processed signal by the reciprocal of the square root of the mean squared error. A base station is coupled to the adjusting circuit wherein the base station has soft decision decoding.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention is particularly well suited for use in TDMA mobile radio systems and shall be described with respect to this application, the methods and apparatus disclosed here can be applied to other digital wireless communication systems.

In TDMA mobile radio systems, such as IS-136, in the uplink from mobile station to base station, data is transmitted periodically in time slots or bursts of a known and fixed duration. Each data burst is processed, essentially independently of other data bursts, by the base station receiver. Thus, it is possible to design the applique so that it introduces artificial delay in excess of its true signal processing delay, so that the total delay through the applique is nominally a multiple of the time slot duration. With this arrangement, the delayed data burst arrives nominally aligned with a later time slot, rather than simply very late for its own time slot.

Since all uplink data bursts are processed by the applique in this way, all uplink bursts are time shifted into later time slots, and thus the net delay of all uplink data is increased by the applique delay. Uplink data bursts typically comprise both voice traffic and various administrative information utilized by the cellular system. Thus, additional considerations with this approach are that the additional voice delay be tolerable to the user, and that the additional delays in the administrative data be tolerable to the cellular system as a whole. Illustratively, for the IS-136 traffic channel, operating with full-rate voice coders, the time from the beginning of the time slot of one user to the beginning of that user's next time slot is 20 milliseconds (ms). This delay is adequate for the necessary signal processing, but is unobtrusive to system users. The IS-136 specifications for administrative data transferred via the traffic channel allow for up to 100 ms response times, so that although the 20 ms of applique delay reduces the delay available, it does not exceed the specification. Thus, this technique is viable for the traffic channel in IS-136, and for other burst-mode wireless communication systems as well. In a Groupe Speciale Mobile (GSM) based system, also known as Global System for Mobile Communications, which is a standard digital cellular phone service in Europe and Japan, the delay would correspond to a multiple of 4.615 ms. In a Digital European Cordless Telecommunications (DECT) based system, which is a pan-European digital cordless telephony interface specification, the delay would correspond to a multiple of 10 ms.

Figure 1:
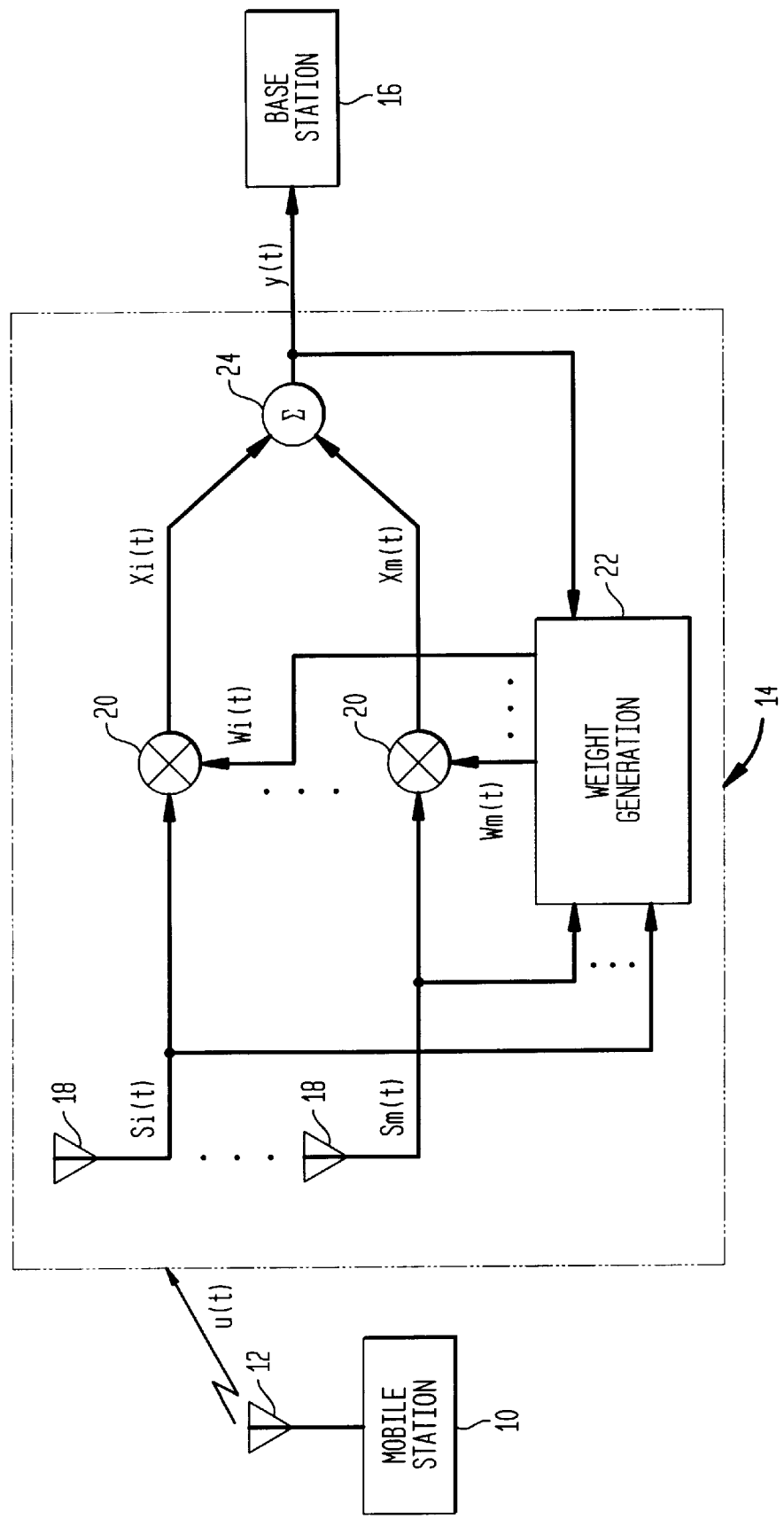
FIG. 1 is a block diagram of an adaptive array using multiple antennas.

Referring to FIG. 1 there is shown a block diagram of a type of signal processing used in a base station applique. A signal u(t) transmitted by a mobile station 10 through a mobile antenna 12 is received by a base station 16 at M antennas 18, with received signals $s_1(t)$ to $s_M(t)$, respectively. The received signals are weighted using multipliers 20 having weights $w_1(t)$ to $w_M(t)$, respectively, to generate corresponding weighted signals $x_1(t)$ to $x_M(t)$. The weighted signals $x_1(t)$ to $x_M(t)$ are then combined using summer 24 to generate an output signal y(t) which is then provided to the base station equipment. Weights $w_1(t)$ to $w_M(t)$ are generated by weight generation circuitry 22 using the received signals $s_1(t)$ to $s_M(t)$ and output signal y(t). At the applique processor circuitry 14, received signals $s_1(t)$ to $s_M(t)$ are weighted and combined to improve signal quality at the output. In one embodiment, the weights are adjusted to minimize the mean-squared-error in the output signal.

The weights can be calculated by a number of techniques, such as the commonly-used techniques of the LMS algorithm and Direct Matrix Inversion (DMI). With DMI, the weights are determined by $$w = \hat{R}_{xx}^{-1} \hat{r}_{xd} \qquad \text{Equation 1.}$$

where $$w = [w_1 \ldots w_M]^T \qquad \text{Equation 2.}$$

where the superscript T denotes transpose, the receive signal cross-correlation matrix is $$\hat{R}_{xx} = 1/K \sum_{j=1}^{K} x(j) x^{\dagger}(j) \qquad \text{Equation 3.}$$

where K is the number of samples that are used, the superscript † denotes complex conjugate transpose, $$x(j) = [x_1(j) x_2(j) \ldots x_M(j)]^T \qquad \text{Equation 4.}$$

$x_i(l)$ is the received signal at antenna i in the Lth symbol interval, the reference signal correlation vector is $$\hat{r}_{xd} = 1/K \sum_{j=1}^{K} x(j) r^*(j) \qquad \text{Equation 5.}$$

the superscript * denotes the complex conjugate, and r(j) is a reference signal.

The reference signal is used by the antenna array to distinguish between a desired and an interfering signal at the receiver. The reference signal must be correlated with the desired signal and uncorrelated with any interference signal. For example, the reference signal can be a known training data sequence in a digital signal, or can be derived from the received signal. Derived signals include using just the phase of the received signal, i.e., $r(t) = y(t)/|y(t)|$, as is used for the constant-modulus algorithm. This technique however does not distinguish between the desired and interfering signals. Alternatively, the reference signal can be the data detected using y(t), a coherently-sliced data-derived reference, after a training sequence has been used as a reference signal for initial acquisition of the weights. Such a technique is described in "Signal Acquisition and Tracking with Adaptive Arrays in the Digital Mobile Radio System IS-54 with Flat Fading," by Jack Winters, IEEE Trans. on Vehicular Technology, November 1993. In all these techniques, the weights are adjusted to minimize the mean-square-error in the output signal, where the error is the difference between the output signal and the reference signal. It is important to note that in all cases the reference signal has fixed amplitude, and thus the output signal should also have fixed amplitude.

Figure 2:
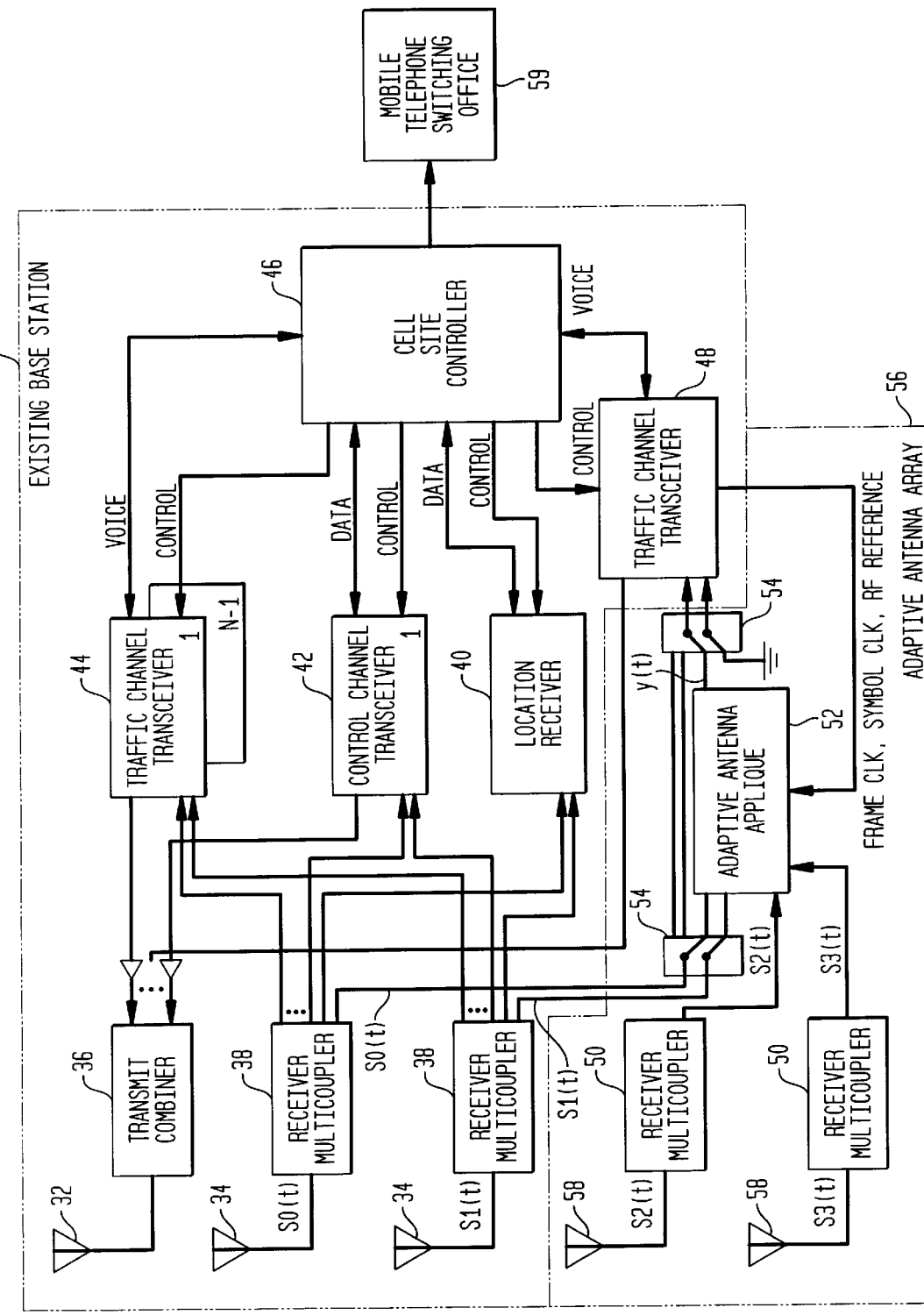
FIG. 2 is a block diagram of a current base station with applique.

Referring to FIG. 2 there is shown an existing base station with an adaptive antenna applique. An existing base station 30 consists of one transmit antenna 32 and two receive antennas 34. Signals received by the receive antennas 34 are coupled to a corresponding receiver multicoupler 38, which splits received signals $s_0(t)$ and $s_1(t)$ to a location receiver 40, control channel transceiver 42, N−1 traffic channel transceivers 44, and traffic channel transceiver 48, one transceiver per traffic channel. For each traffic channel, traffic channel transceiver 44 uses received signals $s_0(t)$ and $s_1(t)$ from receive antennas 34 to generate an output voice signal. The voice signals out of the traffic channel transceiver 44 are fed to cell site controller 46 and then passed to mobile telephone switching office MTSO 59.

To add processing such as that shown in FIG. 1, an antenna applique can be added to the base station, with an exemplary embodiment as shown in FIG. 2, illustratively for improving the performance of traffic channel transceiver 48. The added circuitry 56 has two additional receive antennas 58. Signals received by the additional receive antennas 58 are coupled to corresponding receiver multicouplers 50 as in current base station 30. Signals from the receive antennas $s_0(t)$ to $S_3(t)$ are then processed by adaptive antenna applique 52, which generates output signal y(t) that is fed to traffic channel transceiver 48. In FIG. 2, switches 54 permit an input signal of the traffic channel transceiver 48 to be switched between the existing base station 30 and the adaptive antenna applique 52. In this embodiment the addition of the adaptive applique 52 requires no modification of the existing base station 30.

Figure 3:
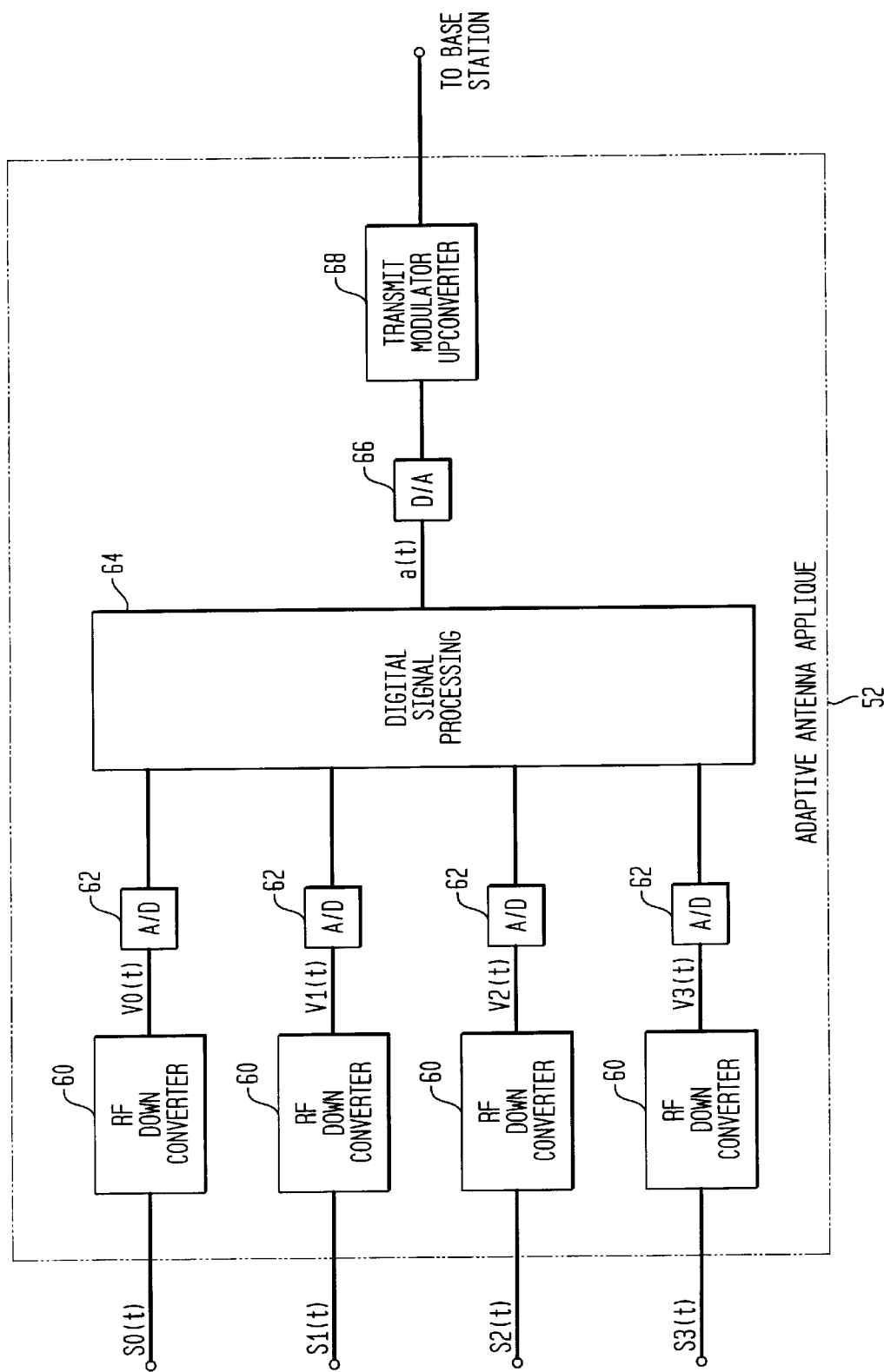
FIG. 3 shows a detailed block diagram of the applique.

Referring to FIG. 3 there is shown further detail of the adaptive antenna applique 52 of FIG. 2. Received signals $s_0(t)$ to $s_3(t)$ from multicouplers 38 and 50 in FIG. 2 are converted from RF to baseband, or to IF, by RF downconverters 60. Output signals $v_0(t)$ to $v_3(t)$ from downconverters 60 are then converted to digital samples by A/D converters 62, and the digital samples are processed by digital signal processing circuitry 64. The digital signal processing circuitry 64 generates an output signal a(t) which is converted to an analog signal by D/A converter 66 and upconverted to the received carrier frequency by Transmit Modulator/Upconverter circuitry 68, and the output signal is then coupled to base station traffic channel transceiver 48 in FIG. 2. The applique processes received signals $s_0(t)$ to $s_3(t)$ so as to generate an output signal which appears to the base station 30 in FIG. 2 to have come from a standard antenna, i.e., the applique processing is transparent to the base station 30.

A key issue for transparency is the soft decision decoding which is performed in many base stations. With soft decision decoding, the received symbols are determined using convolutional decoding based on path metrics which depend on both the phase error per symbol and the amplitude. That is, the decoder uses the information of the phase error per symbol and the amplitude to determine the reliability of the detected symbol. A large phase error implies that the detected symbol is unreliable. Furthermore, as the received signal amplitude varies with the fading, while receiver noise is usually constant, the signal amplitude carries information concerning the signal-to-noise ratio and thus the detected symbol error probability. Utilizing this soft decision information in the decoder typically improves the detector performance by about 2 dB. It is not desired to do this decoding in the applique since decoding and re-encoding of the output signal requires significant complexity and introduces additional delay. For example, in the North American digital mobile radio standard IS-136, interleaving is present on the transmitted signal, both within a time slot and between time slots, and thus decoding introduces at least an additional frame delay, which may be unacceptable. However, without soft decision decoding in the applique, the combining techniques described above will destroy the soft decision information in the array output. Furthermore, detecting the symbols, which may already be done in order to generate the reference signal, and using the symbols to remodulate the carrier to generate the output signal, ensuring no additional errors introduced by the base station receiver, results in the complete loss of the soft decision information, both the phase error and amplitude, resulting in a loss of the 2 dB soft decoding gain.

In order to avoid removing the soft decision information, the remodulated array output signal, rather than the remodulated detected symbols, can be sent to the base station. This array output signal will then have the phase error per symbol needed for soft decision decoding. However, in order to avoid the loss of coding gain, it is not sufficient to simply send the remodulated array output signal to the base station, because the weights adjust the output signal to closely match the reference signal, which has a constant amplitude. Thus, although the array output signal will have the phase error per symbol needed for soft decision decoding, it will also have nearly constant amplitude at the sampling instant. Therefore, the output signal has a noise level which varies with the fading (and a constant desired signal level) rather than a signal level that varies with the fading (and a constant noise level) which is necessary for soft decision decoding. To overcome this problem, the array output magnitude can be adjusted depending on the output noise level, e.g., in an exemplary embodiment by the mean-square-error averaged over several symbols, which is long enough to average the noise but less than the fade duration.

In an exemplary embodiment, the output signal is multiplied by the reciprocal of the square root of the mean-square-error averaged over a sliding window, i.e., for a coherently-sliced data-derived reference, $$y_m(k) = y(k) \bigg/ \left\{ 1/N \sum_{j=k-N+1}^{k} |y(j) - d(j)|^2 \right\}^{1/2} \qquad \text{Equation 6.}$$

where $Y_m(k)$ is the modified output signal sample at time k, and the sliding window has length N. Similarly, for a constant-modulus data-derived reference, $$y_m(k) = y(k) \bigg/ \left\{ 1/N \sum_{j=k-N+1}^{k} (|y(j)| - 1)^2 \right\}^{1/2} \qquad \text{Equation 7.}$$

Alternatively, the weights can be scaled to appropriately adjust the output signal. Note that the adjustment would typically be bounded such that the output signal level would not exceed the dynamic range of the base station.

Figure 4:
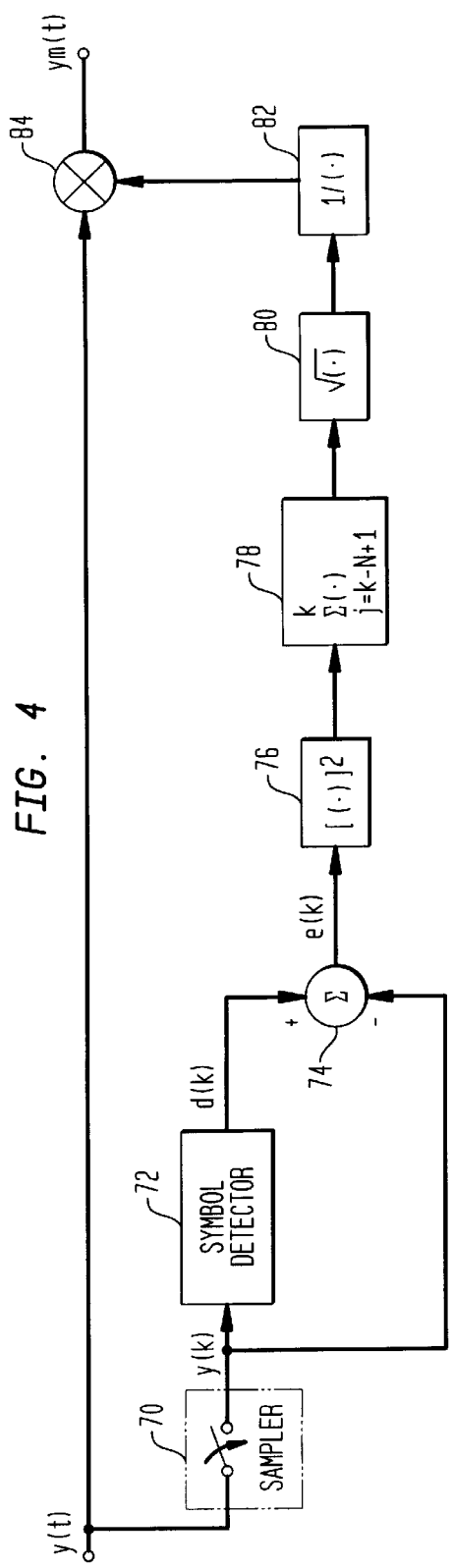
FIG. 4 is a block diagram of an adaptive-array-combiner output magnitude adjustment for a coherently-sliced data-derived reference.

Referring to FIG. 4 there is shown a block diagram of the adaptive-array-combiner output magnitude adjustment for a coherently-sliced data-derived reference which is described in Equation 6. The array output signal (see FIG. 1) y(t) is sampled at the symbol rate by sampler 70 to generate array output signal samples y(k). The samples are then detected by symbol detector 72 which generates the detected symbols d(k). The array output signal samples y(k) are then subtracted from the detected symbols d(k) by summer 74 to generate the error samples e(k). Process block 76 determines the squared magnitude of the samples. Process block 78 generates a sliding window sum of the output of process block 76. Process block 80 generates the square root of the sliding window sum from process block 78. Process block 82 generates the reciprocal of the square root from process block 80 interpolator 83 adjusts the sample timing to be compatible with that of y(k). Multiplier 84 adjusts the magnitude of y(t) by multiplying the output of process block 82 by y(t) to generate output $y_m(t)$ which is output to the base station after upconversion to the receive carrier frequency. Note that this processing is typically be performed by a digital signal processor, and may be the same digital signal processor that performed the adaptive array combining.

Figure 5:
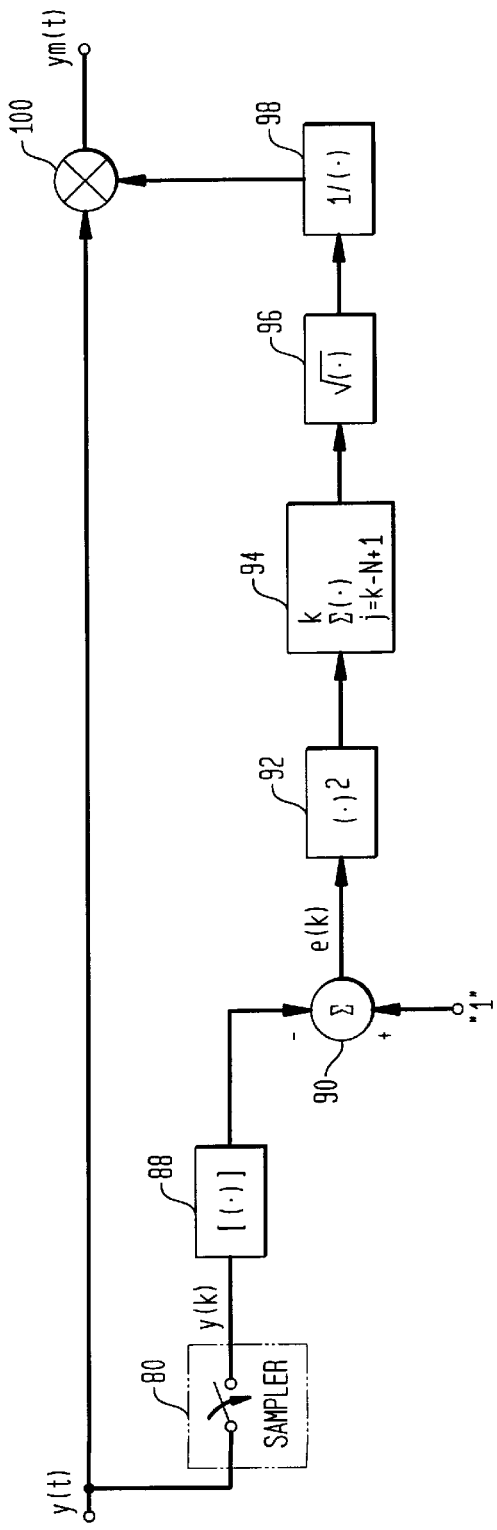
FIG. 5 is a block diagram of an adaptive-array-combiner output magnitude adjustment for a constant-modulus data-derived reference.

Referring to FIG. 5 there is shown a block diagram of the adaptive-array-combiner output magnitude adjustment for a constant-modulus data-derived reference which is described in Equation 7. The array output signal (see FIG. 1) y(t) is sampled at the symbol rate by sampler 86 to generate array output signal samples y(k). The magnitude of these samples is then generated by process block 88. The output of process block 88 is subtracted from the constant 1 by summer 90 to generate the error samples e(k). Process block 92 determines the square of the samples. Process block 94 generates a sliding window sum of the output of process block 92. Process block 96 generates the square root of the sliding window sum. Process block 98 generates the reciprocal of the square root from process block 96 and symbol interpolator 99 adjusts the sample timing to be compatible with that of y(k). Multiplier 100 adjusts the magnitude of y(t) by multiplying the output of process block 98 by y(t) to generate output $y_m(t)$ which is output to the base station after upconversion to the receive carrier frequency.

In another exemplary embodiment, the amplitude can be multiplied by the square root of the trace of the cross-correlation matrix of the received signal, $\hat{R}_{XX}$, which is defined in Equation 3. It should be noted that in a noise limited environment, the trace of $\hat{R}_{XX}$, which is the total received signal power, is approximately the received desired signal power. Thus the square root of the trace can be utilized to estimate the received signal amplitude.

However, in an interference limited environment, the trace of $\hat{R}_{XX}$ may be highly dependent of the interference power in the received signal. In this case the desired signal can be subtracted from the received signal, and the trace of the resulting interference plus noise cross-correlation matrix used as an estimate of the distortion in the received signal. The interference plus noise cross-correlation matrix can be determined by Equation 8, where x(j) is defined in Equation 4 and $\hat{r}_{xd}$ is defined in Equation 5.

$$\hat{R}_{i+n} = 1/K \sum_{j=1}^{K} (x(j) - \hat{r}_{xd}r(j))(x(j) - \hat{r}_{xd}r(j))^{\dagger} \quad \text{Equation 8.}$$

Since the trace of $\hat{R}_{i+n}$ is an estimate of the power of the distortion, the amplitude can be multiplied by the inverse of the square root of this trace. Alternatively, since the trace of $\hat{R}_{i+n}$ divided by the norm of $\hat{r}_{xd}$, i.e., $$\frac{\text{tr}(\hat{R}_{i+n})}{\|\hat{r}_{xd}\|^2}$$

is an estimate of the interference plus noise to signal ratio, the amplitude can be multiplied by the reciprocal of the square root of this quantity.

Numerous modifications and alternative embodiments of the invention will be apparent to those skilled in the art in view of the foregoing description. For example, although the present invention was described and shown for an applique, it is equally well suited for an integrated solution for adaptive arrays in a base station. Accordingly, this description is to be construed as illustrative only and is for the purpose of teaching those skilled in the art the best mode of carrying out the invention. Details of the structure may be varied substantially without departing from the sprit of the invention and the exclusive use of all modifications which come within the scope of the appended claim is reserved.

What is claimed is:

1. An apparatus for performance improvement of a digital wireless receiver comprising:

a processing circuit for processing a plurality of received signals, said plurality of received signals characterized as being distorted by a phase error per symbol and an amplitude error per symbol, said processing circuit first estimating said distortion and providing a processed received signal having an amplitude modified by said first estimate of distortion; and an adjusting circuit for performing the adjustment, said adjusting circuit coupled to said processing circuit, said adjusting circuit adjusting said amplitude of said processed received signal as a function of a second estimate of distortion of said plurality of received signals, wherein the adjusted processed received signal has a phase error per symbol and an amplitude error per symbol correlated to said phase error per symbol and said amplitude error per symbol of said plurality of received signals.

2. The apparatus as recited in claim 1 wherein said processing circuit weights and combines said plurality of received signals.

3. The apparatus as recited in claim 1 wherein said second estimate of distortion is an average of a squared error of said processed signal relative to a reference signal.

4. The apparatus as recited in claim 3 wherein said average of said squared error is computed over a sliding window.

5. The apparatus as recited in claim 3 wherein said function comprises multiplying said processed signal by reciprocal of square root of said average of said squared error.

6. The apparatus as recited in claim 1 wherein said second estimate of distortion is trace of cross-correlation matrix of said plurality of received signals.

7. The apparatus as recited in claim 6 wherein said trace is computed using a window.

8. The apparatus as recited in claim 7 wherein said function comprises multiplying said processed signal by the inverse of the square root of said trace.

9. The apparatus as recited in claim 1 wherein said second estimate of distortion is trace cross-correlation matrix of received signal minus desired signal.

10. The apparatus as recited in claim 9 wherein said trace is computed using a window.

11. The apparatus as recited in claim 9 wherein said function comprises multiplying said processed signal by reciprocal of square root of said trace.

12. The apparatus as recited in claim 1 further comprising a base station coupled to said adjusting circuit wherein said base station has soft decision decoding.

13. The apparatus as recited in claim 1 wherein said processing circuit comprises a digital signal processor.

14. The apparatus as recited in claim 1 wherein said adjusting circuit comprises a digital signal processor.

15. The apparatus as recited in claim 1 wherein said plurality of received signals comprise TDMA mobile radio signals.

16. The apparatus as recited in claim 15 wherein said TDMA mobile radio signals comprise IS-54 based mobile radio signals.

17. The apparatus as recited in claim 15 wherein said TDMA mobile radio signals comprise IS-136 based mobile radio signals.

18. The apparatus as recited in claim 15 wherein said TDMA mobile radio signals comprise GSM mobile radio signals.

19. The apparatus as recited in claim 15 wherein said TDMA mobile radio signals comprise DECT mobile radio signals.

20. The apparatus as recited in claim 2 wherein said processing circuit weights and combines said plurality of received signals using a predetermined symbol pattern within a time slot.

21. A method for performance improvement of a digital wireless receiver comprising the steps of:

processing a plurality of received signals characterized as, having a phase error per symbol and an amplitude error per symbol, for;

providing a processed received signal having an amplitude; and adjusting said amplitude as a function of an estimate of distortion of said plurality of received signals;

wherein said adjusted processed received signal has a phase error per symbol and an amplitude error per symbol correlated to said phase error per symbol and said amplitude error per symbol of said plurality of received signals.

22. The method as recited in claim 21 wherein the step of processing a plurality of received signals comprises weighting and combining of said plurality of received signals.

23. The method as recited in claim 21 wherein said estimate of distortion is an average of a squared error of said processed signal relative to a reference signal.

24. The method as recited in claim 23 wherein said averaging of said squared error is computed over a sliding window.

25. The method as recited in claim 23 the step of adjusting further comprises multiplying said processed signal by reciprocal of square root of said average of said squared error.

26. The method as recited in claim 21 further comprising the step of utilizing soft decision decoding in a base station.

27. The method as recited in claim 21 wherein the step of processing a plurality of received signals comprises utilizing a digital signal processor.

28. The method as recited in claim 21 wherein the step of adjusting said amplitude comprises utilizing a digital signal processor.

* * * * *